United States Patent
Lich et al.

(10) Patent No.: US 7,778,755 B2
(45) Date of Patent: Aug. 17, 2010

(54) METHOD FOR REACHING A DEPLOYMENT DECISION

(75) Inventors: Thomas Lich, Schwaikheim (DE);
Robert Lahmann, Nürnberg (DE);
Michael Schmid, Kornwestheim (DE);
Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 946 days.

(21) Appl. No.: 10/571,232

(22) PCT Filed: Sep. 16, 2004

(86) PCT No.: PCT/DE2004/002068
§ 371 (c)(1),
(2), (4) Date: Nov. 14, 2006

(87) PCT Pub. No.: WO2005/030536
PCT Pub. Date: Apr. 7, 2005

(65) Prior Publication Data
US 2007/0168098 A1 Jul. 19, 2007

(30) Foreign Application Priority Data
Sep. 25, 2003 (DE) ................. 103 44 613

(51) Int. Cl.
*B60R 21/01* (2006.01)

(52) U.S. Cl. .................. 701/46; 701/45; 280/735
(58) Field of Classification Search .............. None
See application file for complete search history.

(56) References Cited

U.S. PATENT DOCUMENTS

| 6,100,797 | A * | 8/2000 | Mattes et al. ............ 340/437 |
| 2002/0075140 | A1 * | 6/2002 | Yeh et al. ............... 340/438 |

FOREIGN PATENT DOCUMENTS

| DE | 101 49 112 | 4/2003 |
| EP | 1 219 500 | 7/2002 |
| WO | 99/47384 | 9/1999 |

* cited by examiner

*Primary Examiner*—Michael J. Zanelli
(74) *Attorney, Agent, or Firm*—Kenyon & Kenyon LLP

(57) ABSTRACT

A deployment decision for a vehicle restraint system is reached as a function of vehicle dynamics data, at least one vehicle transverse acceleration and one yaw rate about the longitudinal axis of the vehicle being linked to one another as the vehicle dynamics data to reach the deployment decision. The vehicle transverse acceleration is then additionally subjected to a threshold value decision for reaching the deployment decision, the threshold value being set as a function of the integrated vehicle transverse acceleration and the integrated yaw rate.

10 Claims, 2 Drawing Sheets

METHOD FOR REACHING A DEPLOYMENT DECISION

FIELD OF THE INVENTION

The present invention is directed to a method for reaching a deployment decision for a restraint system in a vehicle.

BACKGROUND INFORMATION

A method for reaching a deployment decision for a restraint system, e.g., for soil trips, is described in published German patent document DE 101 49 112. Soil trips are understood to mean situations in which the vehicle slides sideways after a skid and then runs into a ground surface having a high coefficient of friction, for example, an unpaved surface next to a roadway. If the vehicle then slides to the right, for example, the tires on the right side of the vehicle experience a severe deceleration which then induces a torque on the vehicle on the unpaved surface. In published German patent document DE 101 49 112, the deployment decision is determined as a function of vehicle dynamics data, i.e., a float angle in conjunction with a vehicle transverse velocity and a vehicle tipping motion being used as the vehicle dynamics data. The deployment decision is then reached through appropriate threshold value comparisons.

Published international patent document WO 99/47384 describes reaching a deployment decision for a soil trip rollover as a function of the yaw rate about the vehicle longitudinal axis, a vehicle speed, and a vehicle transverse acceleration. The vehicle transverse acceleration is compared to a fixed threshold value. It is not possible to reach a deployment decision until this fixed threshold value is exceeded.

SUMMARY

The method according to the present invention for reaching a deployment decision for a restraint system has the advantage that earlier deployment is made possible in the event of soil trips. This is due to the fact that the vehicle transverse acceleration is not only linked to the yaw rate, but is also compared to a threshold value which is set as a function of the integrated yaw rate and the integrated vehicle transverse acceleration. The establishment of the threshold value results in a better adaptation to accident conditions. The threshold may be set continuously or at set time intervals. This threshold value decision may be made by comparing a value pair, composed of the vehicle transverse acceleration and the vehicle transverse velocity, to a characteristic curve.

Analyses of soil trip vehicle tests have shown that the vehicle transverse velocity has a crucial influence on the maximum roll angle achieved, and thus on the rollover behavior of a vehicle. In any case, for reaching a deployment decision, it is advantageous for the signals to be detected from a yaw rate sensor for rotations about the longitudinal axis of the vehicle, and to link these signals with the signals from an acceleration sensor for detecting acceleration in the transverse direction of the vehicle. This results in a higher reliability and an earlier deployment possibility for the restraint system. The vehicle transverse acceleration is suitable, since, as described above, during a soil trip a lateral deceleration occurs at the tires and initiates the rollover.

It is also possible to use not only the vehicle transverse velocity, but also the vehicle transverse acceleration, as well as the yaw rate about the longitudinal axis of the vehicle, to enable a high degree of reliability for the deployment decision and, at the same time, a very early deployment decision.

It is particularly advantageous that the threshold value for the vehicle transverse acceleration is generated as a function of the quotient of the integrated yaw rate and the integrated vehicle acceleration. This quotient is referred to as the rollover susceptibility of the vehicle. The present invention makes use of the following findings: When a body in motion due to its inertia is decelerated by an externally acting force, the inert mass of the vehicle experiences an inertial force. In the simplified assumption of a rigid body, this inertial force may be represented by a force vector acting on the center of gravity of the vehicle. This is illustrated in FIG. 3. A vehicle 30 is subjected to inertial force $F_{inert}$, the vector of which points to the right. To the right of the vehicle an obstruction 31 is also seen, there being a height H1 between the center of gravity at which inertial force $F_{inert}$ acts and obstruction 31.

The higher the center of rotation, thus for example the upper edge of a roadway curb, which in this case is obstruction 31, the lower the torque induced, under constant force, as a result of the inertial force. In the second example in FIG. 3, vehicle 33 once again is subjected to an inertial force $F_{inert}$ which points to the right, but now, height H2 is less since obstruction 32 is higher. Consequently, the torque is also lower. As a result, the higher the center of rotation the greater the inertial force, and thus also the deceleration measured in the vehicle—since the vehicle mass may be assumed to be constant—must be in order to cause the vehicle to overturn. When the height of the center of rotation is equal to or greater than the height of the center of gravity, the vehicle cannot be overturned at all. The acceleration sensors in the vehicle measure an acceleration which allows conclusions to be drawn concerning the magnitude and the direction of the acting force, but not concerning the point of application of the force. To obtain a measure of the effect of the laterally acting force on the rollover behavior of the vehicle, the rollover susceptibility of the vehicle $S_{roll}$ is computed as follows:

$$s_{roll} = \Delta \varphi_x / \Delta v_y = \int_{T_0}^{t\_end} \omega_x dt \Big/ \int_{T_0}^{t\_end} a_y dt \quad (1)$$

In this regard, the start and end points are generated by a suitable calibration. One possible implementation is to define starting time $T_0$ as the time at which the acceleration has exceeded a predefined threshold, and then to set end time $T_n$ as the time when the integral over $a_y$ reaches a predefined value.

It is possible that in the denominator of equation (1) the integral over $a_y$ may be subtracted from the transverse velocity present at the beginning of the soil trip on account of sliding. An expression is then provided in the denominator for the magnitude of speed which is instantaneously present in the transverse direction, the reduction in speed resulting from the impact being taken into account by the integral over $a_y$. The kinetic energy in the transverse direction of the vehicle may then be easily computed. In this instance, a side impact is understood to mean an impact on the side, for example on a curb, or also an impact on the side as the result of the wheels digging into an unpaved ground surface.

The computation of $S_{roll}$ may be refined in such a way that the integral is formed only when an additional condition is met, such as when the acceleration exceeds a minimum value. The formation of $S_{roll}$ is then modified as follows:

$$s_{roll} = \Delta \varphi_x / \Delta v_y = \int_{T_0}^{t\_end} (f_{weight} \times \omega_x) dt \Big/ \int_{T_0}^{t\_end} (f_{weight} \times a_y) dt \quad (2)$$

where the weighting function $f_{weight} = 0$ when the additional condition, for example, the absolute value of $a_y >$ a threshold, is not met, and $f_{weight} = 1$ in all other cases. Thus, at any time during a rollover the rollover susceptibility is determined, and the applicable threshold of a base characteristic curve at this time modifies the applicable formulas.

From the rollover susceptibility a variable g ($S_{roll}$) is then derived, which appropriately varies the threshold for $a_y$, which is generated according to a procedure. One possibility for deriving variable g ($S_{roll}$) is provided by an analytical formula or an additional characteristic curve (look-up table) through which a variable g ($S_{roll}$) is associated with every value of $S_{roll}$. The effect of g ($S_{roll}$) may be, for example, that an existing threshold of $a_y$ is increased by g ($S_{roll}$), as follows:

threshold (new)=threshold (old)+g($S_{roll}$), or is multiplied by g ($S_{roll}$), as follows:

threshold (new)=threshold (old)*g($S_{roll}$).

One example for the modification of a threshold by g ($S_{roll}$) is provided in FIG. 4.

Furthermore, it is advantageous for the yaw rate to be compared to a threshold value which is likewise set as a function of the integrated yaw rate and the integrated vehicle transverse acceleration. Here as well, it is possible for the rollover susceptibility to be used for establishing the threshold value for the yaw rate, as described above. A base characteristic curve for the threshold value is then also used for the yaw rate, the threshold value being modified as a function of the rollover susceptibility.

DETAILED DESCRIPTION

Figure 1:
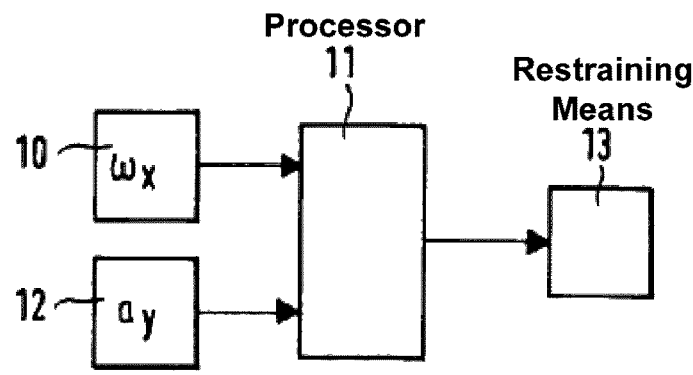
FIG. 1 shows a block diagram of an example embodiment of the system according to the present invention.

Modern systems for sensing rollover events use micromechanical yaw rate sensors which allow the rotational angle to be computed by numerical integration. The combination of information on the yaw rate and the rotational angle allows a prediction of the rollover, and thus a deployment decision, which is more robust and flexible than deploying via a fixed angle threshold of an inclination sensor. Rollover sensing systems based on yaw rate sensors thus allow deployment of irreversible restraining means, such as pyrotechnic seat belt tensioners and windowbags, in addition to the original applications of rollover sensing, the deployment of a reversible roll bar in convertibles. A classic rollover is induced when during straight-ahead driving the vehicle is forced by conditions of the surroundings into a z-directional motion, i.e., in the vertical direction, resulting in a rotation of the vehicle. Typical examples of such situations include sloping embankments next to the roadway, and ramps typically provided with lateral guard rails. The lateral accelerations which arise in such maneuvers are relatively low, and the occupants are put into an "out of position" situation late, if at all, so that the deployment of occupant protection systems is not necessary until a relatively late point in time. In this regard, "out of position" situation means that a passenger is not in the seated position in which the restraining means provides the optimum protection.

However, the matter is different for soil trip rollovers. These are situations in which the vehicle slides sideways after a skid and then runs into a ground surface having a high coefficient of friction, such as an unpaved surface next to a roadway. If the vehicle then slides to the right, the tires on the right side experience a strong deceleration which then creates a torque on the vehicle. The critical difference from the previously described rollover is that, because of great lateral deceleration of the vehicle, the passengers are put "out of position" very early. It is therefore necessary to protect the passengers at a very early point in time by activating the appropriate protective devices, such as windowbags, for example, before injuries occur by impact with the B-pillar or window. Such an early deployment is not possible with current systems, at least not without incurring the risk of unintentional deployment of the restraining means in many non-deployment situations. The present invention provides a method which allows an earlier deployment time in the case of soil trips.

To allow such an early deployment time in the case of soil trips, the present invention uses, in addition to the variables of yaw rate and acceleration in the y and z directions, an appropriately determined vehicle velocity in the y direction, i.e., the vehicle transverse velocity.

According to the present invention, the deployment decision is reached in such a way that, in addition to linking the yaw rate and the vehicle transverse acceleration, the vehicle transverse acceleration is subjected to a threshold value decision, the threshold value being set as a function of the integrated yaw rate and the integrated vehicle transverse acceleration. The vehicle transverse velocity may be used for this purpose.

The appropriately filtered acceleration in vehicle transverse direction $a_y$ is particularly suited for the threshold value decision, since a lateral acceleration on the tire initiates the rollover. As confirmed by vehicle tests, in order to roll over a vehicle, transverse acceleration $a_y$ must increase with decreasing vehicle transverse velocity $v_y$. Normally the relationship is not linear, and is taken into account by the threshold decision. Rather, as a function of the vehicle transverse velocity, the critical transverse acceleration, i.e., the transverse acceleration resulting in a rollover, shows a gradient which becomes larger as the vehicle transverse velocity more closely approaches the "critical sliding velocity" (CSV) from higher speeds. The CSV is defined as the transverse velocity of the vehicle below which a rollover of the vehicle due to physically based principles, i.e., the energy balance, is impossible. The exact shape of the characteristic curve depends on the type of vehicle and the requirements for the system. However, in the following example it may be assumed that the characteristic curve, i.e., the absolute value of the critical transverse acceleration, monotonically increases as a function of the vehicle transverse velocity for decreasing values of $v_y$.

Besides $a_y$, the appropriately filtered yaw rates $\omega_x$ about the longitudinal axis of the vehicle are also suitable for the threshold value decision, which in this instance is used as a link. The use of $\omega_x$ may be less intuitive, since a lateral deceleration initiates the soil trip process. However, analyses of corresponding vehicle tests have shown that both $\omega_x$ and $a_y$, with appropriate filtering, are suitable as variables for a deployment decision.

By assuming a continuous, essentially exact determination of the vehicle transverse velocity $v_y$, after a starting condition for the algorithm is met, the sensed values for $a_y$, $\omega_x$, and $v_y$ are continuously, i.e., in each loop of the algorithm, compared to the critical values stored in the form of a characteristic curve. If the value pair ($a_y$, $v_y$) at a time t is greater than the critical value of the characteristic curve, the primary deployment condition is met. It must also be ensured that the lateral acceleration also in fact induces a rotation. This subject will be discussed further below. In addition to $a_y$, $\omega_x$ may also be compared to a threshold value set as a function of $v_y$, or the $v_y$-dependent threshold value may be modified as a function of $\omega_x$.

In the following discussion it may be assumed that $a_y$ is negative, i.e., is a deceleration, and that both $v_y$ and yaw rate $\omega_x$ are positive. If it is assumed that $a_y$ is determined by a sensor in the airbag control unit, the algebraic sign depends on whether the soil trip occurs as the result of lateral sliding to the left or right. Likewise, the algebraic sign of $v_y$ depends on the convention used in the determination of $v_y$. The following method is provided for the implementation in the microcontroller, i.e., in the processor in the airbag control unit:

The absolute values for all variables $v_y$, $a_y$, and $\omega_x$ are determined. In addition, an algebraic sign ensures that $v_y$, $a_y$, and $\omega_x$ point in the same direction as a condition for a rollover.

The lateral acceleration which results in tipping of the vehicle is essentially determined by the position of the center of gravity and the track width of a vehicle, and is determined by computer using the static stability factor (SSF). Typical values for automobiles and sport utility vehicles (SUVS) are in the approximate range of SSF=1.0 to 1.7. The SSF corresponds to the lateral acceleration, in units of g, necessary to tip over the vehicle. A characteristic curve for $|a_y|$ at $v_y$, will therefore always have a value as the lowest deployment threshold which is greater than the SSF value, in g, for the corresponding vehicle. Depending on the ground surface, however, it is also possible for a high acceleration to develop on all tires, i.e., not only on the right or left tires, during lateral skids to the right or left, respectively, so that, although the vehicle skids sideways, no sufficiently large torque is induced to cause the vehicle to tip. If one relies solely on a threshold value for $|a_y|$ as a function of $v_y$ to be exceeded for the deployment decision, in the worst case scenario this may result in deployment under high vehicle transverse acceleration without significant development of a tipping angle. To suppress deployment in such cases, it is advantageous to link an additional deployment condition to the yaw rate signal. The following methods provide a possible implementation of the yaw rate signal being additionally taken into account:

a) As an additional deployment condition, a threshold for the appropriately filtered yaw rate must be exceeded.

b) As an additional deployment condition, a threshold for the integrated yaw rate, i.e., the resulting angle, must be exceeded, it being advantageous to link the start of integration to a threshold value for the yaw rate being exceeded.

c) Furthermore, the start of an integration of a yaw rate may be linked to a threshold value for the vehicle transverse acceleration being exceeded. In this case, the yaw rate is not integrated unless the appropriately filtered vehicle transverse acceleration is greater than a defined value. As an additional deployment condition, it is then required that the resulting integral, having the dimension of an angle, must exceed a threshold value.

The above-described tasks do not result when a threshold value for $\omega_x$ is considered as a function of $v_y$. However, even for driving maneuvers that are not relevant to soil trips, such as for fast driving on narrow curves, very high yaw rates may develop which then possibly may result in spurious deployment. In this case, it is therefore advantageous to introduce a threshold based on the sensor signal for the vehicle transverse acceleration. Similarly to the above-described additional deployment conditions based on the yaw rate signals, the following implementation examples are described:

a) As an additional deployment condition the threshold for the appropriately filtered vehicle transverse acceleration must be exceeded.

b) As an additional deployment condition a threshold for the integrated vehicle transverse acceleration, i.e., the drop in velocity, must be exceeded, it being advantageous to link the start of integration to a threshold value for the vehicle transverse acceleration being exceeded.

c) Furthermore, an integration of the yaw rate may be linked to a threshold value for the yaw rate being exceeded: in this case, the vehicle transverse acceleration is not integrated unless the appropriately filtered yaw rate is greater than a defined value. As an additional deployment condition, it is then required that the resulting integral, having the dimension of a speed, must exceed a threshold value.

Thus, in any case it is advantageous for a deployment decision to link the signals from a yaw rate sensor and an acceleration sensor. Methods have been described heretofore in which a primary deployment decision was made based on a characteristic curve for $a_y$ and $\omega_x$ and then an additional, less stringent deployment condition was based on a plausibility check of the response of $\omega_x$ and $a_y$. Of course, an equivalent deployment decision for $a_y$ and $\omega_x$ is also possible, i.e., characteristic curves may be defined for both $a_y$ and $\omega_x$, the deployment decisions for which are appropriately linked, such as by a simple logical AND. In addition, $a_y$ and $\omega_x$ may be suitably processed (filtering and integration, for example) and linked.

FIG. 1 illustrates in a block diagram the system according to the present invention. For the sake of simplicity, only the components which are involved in the decision method according to the present invention are shown, although it is possible for many more components to be included in the system. A yaw rate sensor 10 for detecting yaw rate $\omega_x$ about the longitudinal axis of the vehicle is connected to a first input of a processor 11. An acceleration sensor 12 which detects accelerations in the transverse direction of the vehicle is connected to a second input of a processor 11. Restraining means 13, such as airbags, seat belt tensioners, and roll bars are connected to an output of processor 11. Components 10, 11, and 12 may be located in a common control unit. However, it is possible for sensors 10 and 12 to be situated outside the control unit in which processor 11—which may be a microcontroller, for example—is located, the sensors being situated, for example, in a kinematic sensor platform. Sensors 10 and 12 may be connected to analog inputs of microcontroller 11. The analog-digital conversion then occurs in microcontroller 11. However, sensors 10 and 12 may each be digital sensors, which already emit digital signals. Therefore, digital inputs are then used for controller 11 to detect the sensor signals from yaw rate sensor 10 and acceleration sensor 12.

Microcontroller 11 uses variables $\omega_x$ and $a_y$ to make a deployment decision with respect to a rollover. Most rollovers occur about the longitudinal axis of the vehicle. The deployment decision is made as a function of threshold value decisions concerning vehicle transverse acceleration $a_y$ and, optionally, yaw rate $\omega_x$. In this instance, this threshold value is varied to account for various circumstances, the various obstructions, which result in different heights of the centers of rotation. The threshold value for $a_y$ is generated from the quotient of integrated yaw rate $\omega_x$ and integrated vehicle transverse acceleration $a_y$, and $a_y$ is then compared to this threshold value. If $a_y$ is greater than the threshold value, the deployment decision is reached; if $a_y$ is lower than the threshold value, the deployment decision is suppressed.

Figure 2:
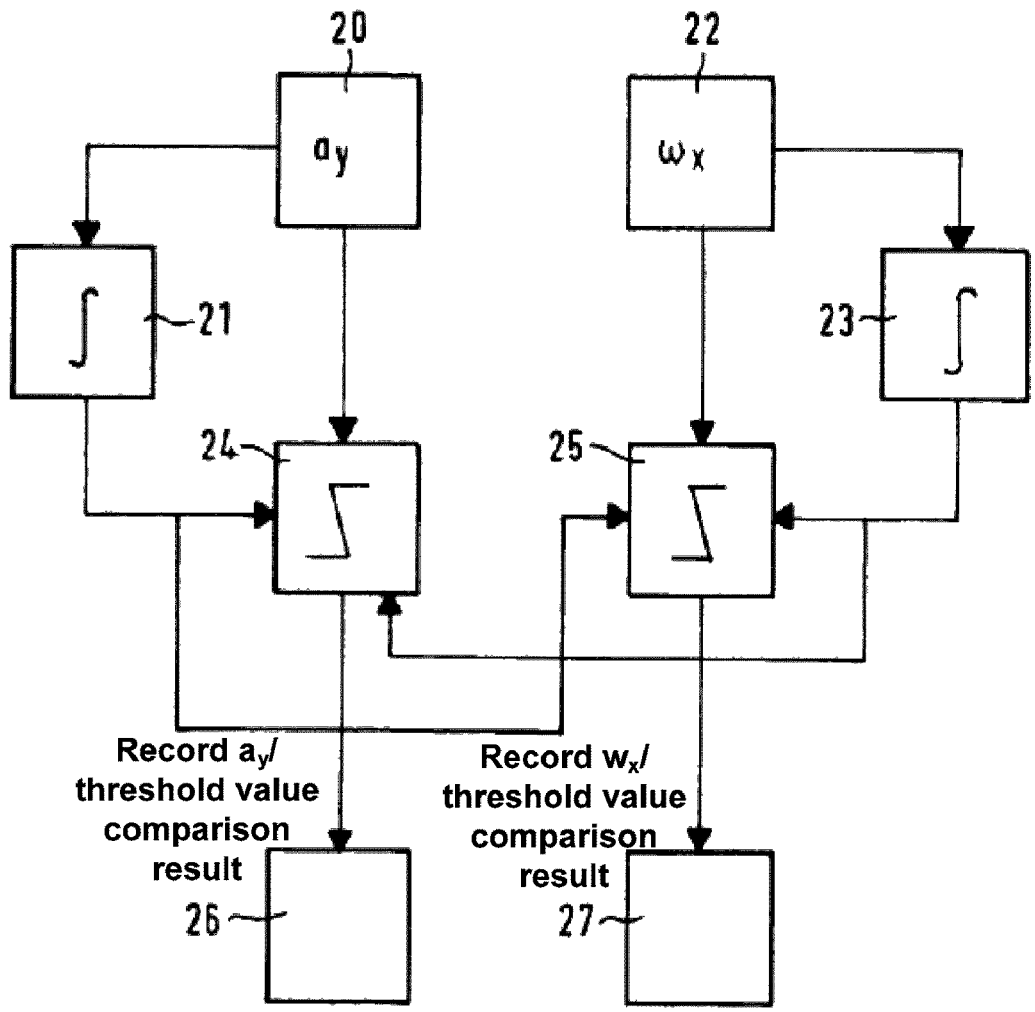
FIG. 2 shows a block diagram illustrating an example method according to the present invention.

FIG. 2 illustrates in a block diagram the sequence of the method according to the present invention. Vehicle transverse acceleration $a_y$ is detected by acceleration sensor 12 in block 20. Vehicle transverse acceleration $a_y$ is integrated in block 21 and compared to a threshold value in block 24, which threshold value is determined as a function of the integrated vehicle transverse acceleration and the integrated yaw rate from block 23. The result of the threshold value comparison is recorded in block 26 in order to then reach the deployment decision. Yaw rate $\omega_x$ is detected by sensor 10 in block 22. The yaw rate is likewise integrated in block 23 and subjected to a threshold value comparison in block 25, this threshold value also being generated as a function of the integrated yaw rate and the integrated vehicle transverse acceleration. As illustrated, the threshold value generation is performed by forming a quotient, so that the rollover susceptibility sets the threshold value in each case. The result of the threshold value comparison of yaw rate $\omega_x$ with its threshold value in block 25 is recorded in block 27, and is available for further processing.

Figure 3:
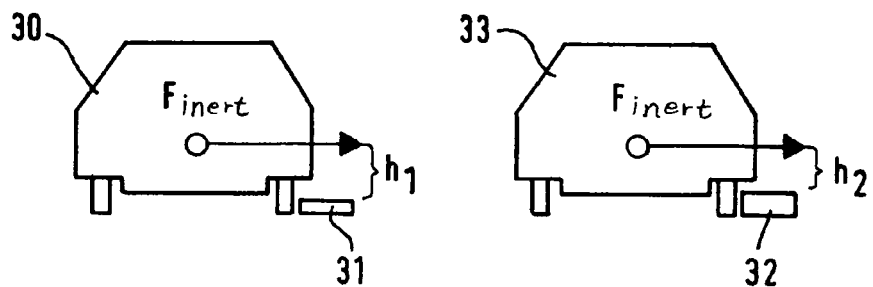
FIG. 3 illustrates the effects of various heights of laterally positioned obstructions.

FIG. 3 shows two typical situations involving vehicle torques. On the left, vehicle 30 is subjected to an inertial force $F_{inert}$ to the right. The inertial force acts on the center of gravity of the vehicle. Therefore, the arrow representing the inertial force is drawn in at that point. Vehicle 30 therefore moves to the right against obstruction 31. A torque is thus induced by obstruction 31 which results from the product $F_{inert}*H$. H is the vertical distance between the upper edge of the obstruction (center of rotation) and the center of gravity of the vehicle. Comparing the left-hand and right-hand illustrations in FIG. 3, Hi>H2, so that in the right-hand illustration a greater force, i.e., deceleration, must act on the vehicle to generate the same torque when the vehicle begins to tip.

Figure 4:
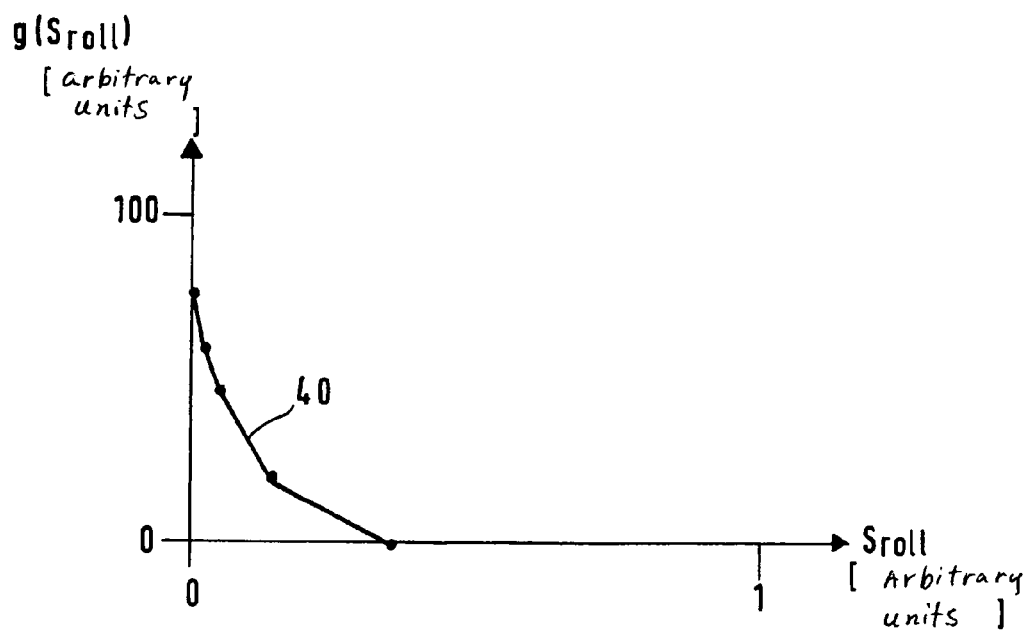
FIG. 4 shows the relationship between the rollover susceptibility and the modified value for the thresholds.

In FIG. 4, rollover susceptibility $S_{roll}$ is plotted in arbitrary units on the x-axis. Modification factor $g(S_{roll})$ is likewise plotted in arbitrary units, on the y-axis. A curve 40 describes the relationship therebetween. In this instance the relationship is empirical. Curve 40 may alternatively be linear or exponential.

What is claimed is:

1. A method for making a deployment decision for a restraint system in a vehicle, comprising:
    detecting a vehicle transverse acceleration and a yaw rate about the longitudinal axis of the vehicle;
    linking the vehicle transverse acceleration and the yaw rate about the longitudinal axis of the vehicle as vehicle dynamics data;
    comparing the vehicle transverse acceleration to a first threshold value, wherein the first threshold value is set as a function of an integrated vehicle transverse acceleration and an integrated yaw rate about the longitudinal axis of the vehicle; and
    making the deployment decision based at least on the vehicle dynamics data and the comparison of the vehicle transverse acceleration to the first threshold value.

2. The method as recited in claim 1, wherein the first threshold value is set as a function of a ratio of the integrated yaw rate and the integrated vehicle transverse acceleration.

3. The method as recited in claim 2, wherein integrations for deriving the integrated vehicle transverse acceleration and the integrated yaw rate start as a function of the vehicle transverse acceleration and end as a function of an integral value for the vehicle transverse acceleration.

4. The method as recited in claim 2, further comprising:
    comparing the yaw rate to a second threshold value, wherein the second threshold value is set as a function of the integrated yaw rate and the integrated vehicle transverse acceleration.

5. The method as recited in claim 4, wherein the second threshold value is formed as a function of a quotient of the integrated yaw rate and the integrated vehicle transverse acceleration.

6. The method as recited in claim 5, wherein in the determination of the quotient of the integrated yaw rate and the integrated vehicle transverse acceleration, the integrated vehicle transverse acceleration is subtracted from a vehicle transverse velocity at the beginning of a lateral impact event.

7. The method as recited in claim 2, wherein in the determination of the ratio of the integrated yaw rate and the integrated vehicle transverse acceleration, the integrated vehicle transverse acceleration is subtracted from a vehicle transverse velocity at the beginning of a lateral impact event.

8. The method as recited in claim 1, wherein integrations for deriving the integrated vehicle transverse acceleration and the integrated yaw rate start as a function of the vehicle transverse acceleration and end as a function of an integral value for the vehicle transverse acceleration.

9. The method as recited in claim 1, further comprising:
    comparing the yaw rate to a second threshold value, wherein the second threshold value is set as a function of the integrated yaw rate and the integrated vehicle transverse acceleration.

10. The method as recited in claim 9, wherein the second threshold value is formed as a function of a quotient of the integrated yaw rate and the integrated vehicle transverse acceleration.

* * * * *